Dec. 20, 1960 H. S. McCULLOUGH, JR., ET AL 2,965,334
MISSILE ATTITUDE CONTROL SYSTEM
Filed Oct. 21, 1959 3 Sheets-Sheet 1

Hugh S. McCullough Jr.
Jewell M. Hall
INVENTOR.

BY S. J. Rotondi,
A. T. Dupont, and
Alvin E. Moore.

Dec. 20, 1960   H. S. McCULLOUGH, JR., ET AL   2,965,334
MISSILE ATTITUDE CONTROL SYSTEM
Filed Oct. 21, 1959   3 Sheets-Sheet 2

Hugh S. McCullough Jr.
Jewell M. Hall
*INVENTOR.*
S. J. Rotondi,
BY A. T. Dupont, and
Alvin E. Moore United States Patent Office 2,965,334
Patented Dec. 20, 1960

2,965,334
MISSILE ATTITUDE CONTROL SYSTEM
Hugh S. McCullough, Jr., 1405 Hermitage Ave. SE., and Jewell M. Hall, 162 Warren Drive NW., both of Huntsville, Ala.
Filed Oct. 21, 1959, Ser. No. 847,853
5 Claims. (Cl. 244—14)
(Granted under Title 35, U.S. Code (1952), sec. 266)

The invention described herein may be manufactured and used by or for the Government for governmental purposes without the payment of any royalty thereon.

This invention relates to a missile attitude control system. More particularly, the invention pertains to a pressurized gas system for supplying pressure to missile components that are operated by fluid motors. The system also may be used to supply pressure to tools in locations where space and weight are especially important—for example, tools on spacecraft.

When such a system is used to supply pressure to attitude control nozzles for use in space vehicles it should be capable of maintaining a working pressure over a long period of time without the danger of explosions from too much pressure and should be adaptable to small spaces and be of minimum weight.

In view of these facts, an object of this invention is to supply working pressure to components over a long period of time without having a large initial pressure.

Another object is to eliminate the danger of explosion that is present in old-type systems, which are required to store the necessary amount of pressure before take-off, by reducing the amount of pressure in the system at take-off.

A further object of this invention is to provide a system that is suitable for use in missiles or other similar places due to its savings in space and weight.

Another object is to provide a light-weight, low-volume pressurized-gas system whose pressure range is automatically maintained.

The foregoing and other objects of this invention will become more apparent from the following detail description and from the accompanying drawings, in which.

Figure 1:
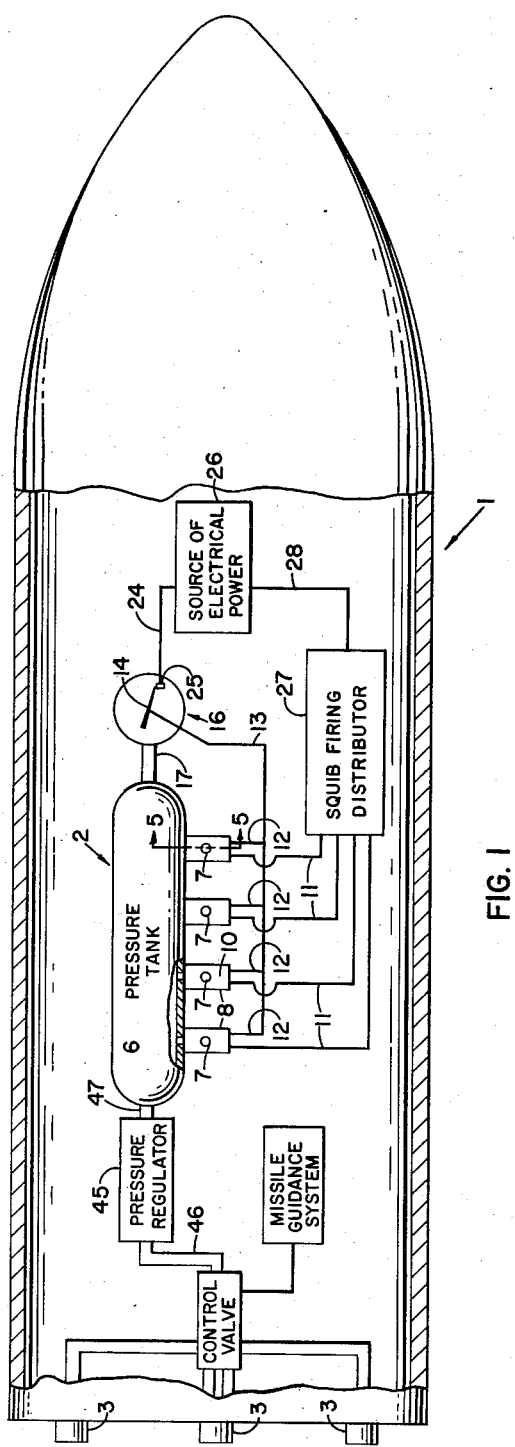
Figure 1 is a semi-schematic view showing the attitude control system.

In the drawings, wherein for the purpose of illustration there are shown preferred embodiments of the invention, the numeral 1 designates a missile body having a pressure system 2 adapted to supply pressure to the attitude control nozzles 3, or other missile components requiring pressure for operation.

Figure 5:
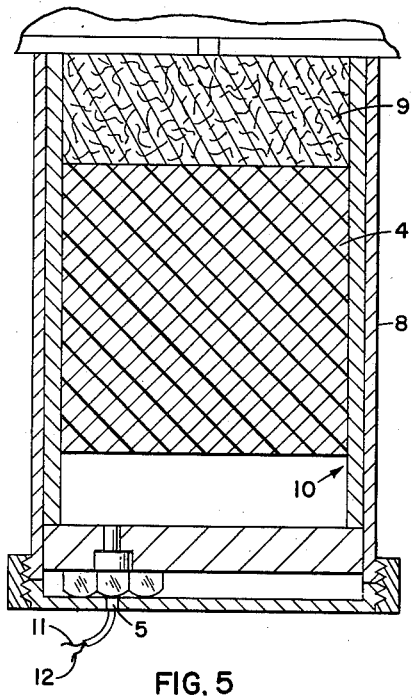
Figure 5 is a sectional view, along line 5—5 of Figure 1 of one type of the pressure creating device used in the invention.

The pressure system contains a pressure tank 6, which has a plurality of squib casings 8, which in the form of Figure 5 is connected at one of its ends with the interior of tank 6. This end is fitted with a filter, 9. The other ends of holders 8 are adapted to be sealed, so that the filtered ends, leading into tank 6, are the only exits from the casings.

Holders 8 are adapted to receive an explosive, pressure-creating device 10, pressure actuated valves 7 and a pair of electrical conductors 11 and 12, which are sealed in place in casing 8 and are connected with device 10. Conductors 12 join conductor 13, which is connected to a movable contact arm 14 of a circuit control device 16.

The pressure creating devices comprise an ignitable gas generating member 4 and an electrically fired squib 5. Element 4 comprises any known chemical which will produce a substantial quantity of gas when it burns, such as the known types of solid propellant or gun powder.

Figure 2:
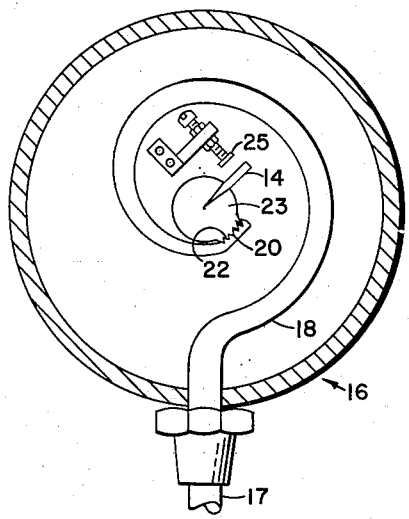
Figure 2 is a sectional view showing the fluid circuit governor used with the system.

The circuit control device is secured to tank 6 by pressure line 17, whose end opposite from device 16 connects with the interior of tank 6. As shown in Figure 2, the other end is connected to hollow coiled member 18, located inside control device 16. The free end of member 18 is closed and contains a row of teeth 20 along one side.

Teeth 20 are engaged with a second row of teeth 22, which are positioned on a rotatable part 23. Part 23 is journalled on a wall of device 16, and is connected to movable contact arm 14, so that a stationary contact 25 will be engaged by arm 14 when the pressure in tank 6 and line 17 drops below a predetermined valve. Contact 25 is electrically connected by conductor 24 to one side of a source of power 26. The other side of the source of power is connected by conductor 28 to sequence means or firing distributor 27.

The firing distributor is operated by motor 29. This motor drives rotatable shaft 30, preferably by reduction gearing 33. One end of shaft 30 extends thru the non-conducting base of housing 31 and a circular contact plate 32, which is secured to said base and is connected to electrical conductor 28. The remaining portion of said last-named shaft end is enclosed by and drivably secured to one end of non-conducting shaft 34. The other end of shaft 34 comprises a shoulder 37 and screw-threads extending from said shoulder to the end of the shaft.

The shoulder is adapted to receive a pair of integrally connected, rotatable contact members 35 and 36, which are held against said shoulder by a nut 38, screwed on said screw threads. Member 35 has two legs, which rotate around the axis of shaft 34 and are positioned in contact with plate 32. Member 36 rotates with member 35 and connects member 35 to a plurality of contacts 39 as the members rotate around the axis of shaft 34.

Contacts 39 are connected to squib holders 8 by conductors 11, thereby completing in sequence, electrical circuits from control device 16 to the various squibs.

The operation of the embodiment shown in Figures 1 to 5 is as follows:

Tank 6 is initially filled with pressurized gas from outside the system. As the pressure of this gas reaches member 18, the member expands causing rotation of member 23, due to engagement of teeth 20 and 22. This rotation breaks contacts 14 and 25. When contacts 14 and 25 are separated an operator connects the source of electric power to the circuit, as by a plug or switch.

The pressurized system is now ready for use with a plurality of attitude control nozzles 3, each of which is spaced from the longitudinal axis of the missile. These nozzles are connected to a pressure regulator or reducing valve, 45, by line 46. The regulator receives pressure thru its connection to tank 6 by line 47. As the pressurized fluid is utilized coiled member 18 contracts, causing the gap between contacts 14 and 25 to become smaller, until they are joined. When the contacts are joined circuit governor 16 completes a circuit to motor 29 and plate 32. The motor rotates shaft 34 until contact member 36 connects with one of contacts 39.

This connection completes a circuit to one of the pressure creating devices causing its squib to burn or explode, and ignite material 4. This tank 6 is replenished with pressurized fluid. The resulting higher gaseous pressure enters the coiled member, causing it to expand and rotate member 23, which is connected to contact arm 14. This rotation breaks the electrical connection between contact arm 14 and contact 25, which causes motor 29 to stop, and the sequential firing of the squibs to cease.

The firing circuit will remain inoperative until the pressure again goes below the predetermined level; and then the above cycle will take place again. This process will continue until all the squibs are fired. The number of squibs is determined by the length of time that pressure is required.

Figure 6:
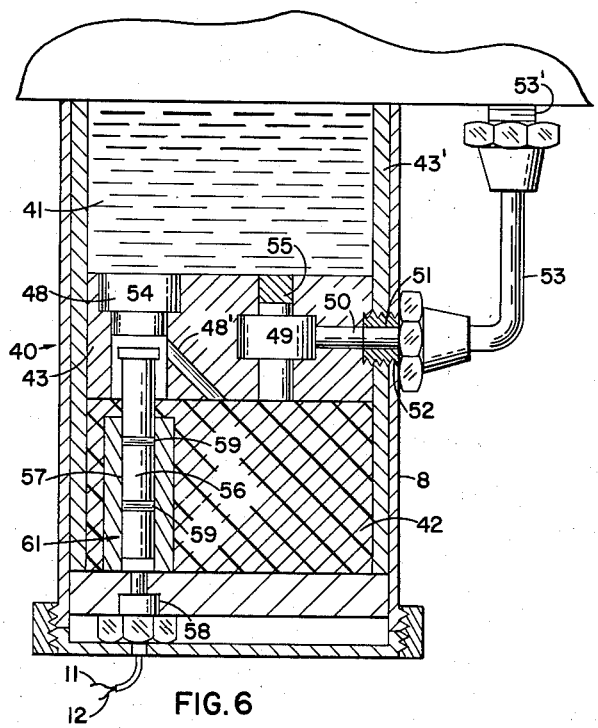
Figure 6 is a sectional view of a second embodiment of the pressure creating device, comprising chemicals separated by a member adapted to prevent mixing of the chemicals until a predetermined time.
Figure 3:
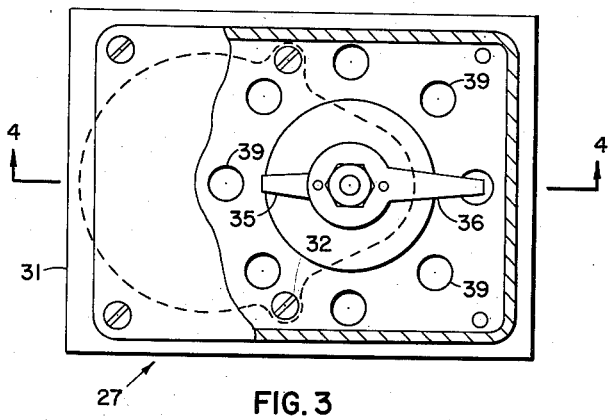
Figure 3 is a plan view, partially broken away, of the electric circuit sequence means for control of successively-operated, individual gas-suppliers.
Figure 4:
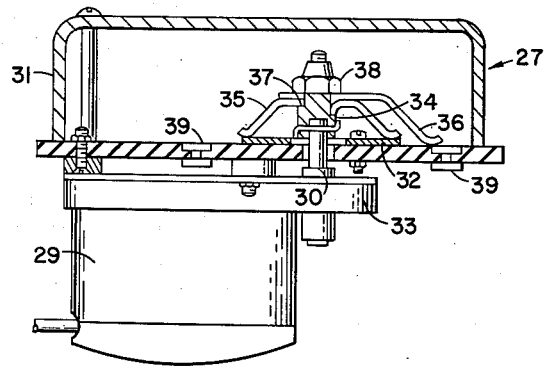
Figure 4 is an elevational view partly in section along the plane 4—4 of Figure 3.

The embodiment shown in Figure 6 comprises gas generating chemicals, 41 and 42, such as water and calcium carbide. These chemicals may be two liquids, or a solid and a liquid, and separation member 43 secured to cartridge case 43' between the chemicals. Member 43 has apertures 48 and 48' closed and sealed by movable plug 54, which temporarily prevents connection of the two chemicals. The member also has a passage 49—50, temporarily closed by pressure-responsive plug 55. One end of each aperture 50 is enlarged and screwthreaded, so as to receive a connector 51, fitted thru aperture 52 in holder 8.

Each connector 51 receives one end of a conduit 53. The other end of each conduit 53 is connected at 53' to tank 6, to provide a gas-supply passage from said pressure creating device to said tank.

Plug 54 is adapted to separate the chemicals until unseated by piston 56 of fluid motor 61. This piston is reciprocable in cylinder 57, which is connected with squib 58, that supplies operating pressure for piston 56. A pressure tight fit is maintained between the cylinder and piston by a plurality of O rings 59.

The operation of this embodiment is the same as that of the first embodiment, except in the functioning of the pressure creating means. When the electrical circuit is closed by the circuit governor a squib is fired as described in the first embodiment; but in the embodiment of Figure 6 the squib serves to operate piston 56.

When piston 56 is thus operated by gas from the squib, the piston drives plug 54 upward from its seat, thus allowing the two gas generating chemicals to mix and creating a rise in pressure. Pressurized gas then enters the upper chemical chamber, and at a predetermined pressure the gas forces plug 55 from its seat. The gas then passes thru aperture 50 and conduit 53 to tank 6.

The remainder of the operation is the same as the operation of the first embodiment.

It is to be understood that the forms of the invention that are herein shown and described are preferred embodiments, and that various changes in the shape, size and arrangement of parts may be resorted to without departing from the spirit of the invention, or the scope of the subjoined claims.

The following invention is claimed:

1. A missile attitude control system comprising: a pressurized-gas tank having two pressurized-gas outlets and a plurality of pressurized-gas inlets; a pressure-operated governor means for making and breaking an electrical circuit, connected to one of said pressurized-gas outlets; an electric motor; a current distributor operably connected to said motor; a plurality of casings connected to said pressurized-gas inlets; means in each of said casings for creating a pressurized gas, said means being in communication with one of said pressurized-gas inlets; a source of electric power; an electrical circuit connecting said source of power, governor means, distributor, motor and said means for creating pressurized gas; a pressure regulator secured to the other pressurized-gas outlet; a plurality of missile attitude control nozzles; conduit means to connect said nozzles to said pressure regulator; a valve in said conduit mean to selectively route pressurized-gas to said nozzles; and means to control said valve for control of the route of the pressurized gas to said nozzles.

2. A pressurized-gas system comprising: a tank for storing and supplying pressurized gas; gas supplying means for replenishing said tank; control means to actuate said gas-supplying means for adding gas to said tank when the pressure therein is low; a conduit connected to said tank; a pressure-controlled circuit governor having a pair of contact points and means to make and break said points; said governor being connected to said conduit and electrically connected to said source of power and said control means, whereby said governor governs actuation of said control means, when the pressure of said tank is below a predetermined amount to cause said control means and gas-supplying means to add gas to said tank.

3. A device as set forth in claim 2, in which said control means comprises squibs, an electric motor, a circuit selection distributor drivably connected to said motor and electrical means connecting said distributor and said squibs.

4. A device as set forth in claim 3, in which said gas-supplying means comprises a plurality of cartridges, each of which comprises: two chemicals; a movable member separating said chemicals; and a fluid motor flow-connected to one of said squibs, operable by pressurized gas from said one squib, for moving said movable member, whereby said chemicals are allowed to come together and form a gas.

5. A missile control system comprising an elongated pressurized-gas tank provided with an aperture in each end and a plurality of apertures intermediate the tank ends; a pressure line fitted in one of said end apertures; an electrical circuit governor, connected to said pressure line, said governor comprising a wall, a pressure-controlled, coiled member connected to said pressure line at one of said member's ends and closed at its other end, a row of teeth on said last-named end, a member journalled on said wall, a row of teeth on said journalled member in mesh with said first-named teeth, a movable contact attached to said journalled member, and a stationary adjustable contact adapted to engage said movable contact; a source of electric power connected to each of said contacts; a firing distributor comprising a nonconducting, contact-supporting plate having an aperture, a flat plate of electrically conductive material fixed to said nonconducting plate, a plurality of spaced contacts secured to said nonconducting plate and radially arranged relative to said aperture, means connecting said flat plate to said source of electric power, a rotatable contact engaged with said flat plate, a second rotatable contact fixed to said first rotatable contact and successively engageable with said spaced contacts, a rotary shaft nonconductively supporting said rotatable contacts; a motor drivably connected to said shaft and means electrically connecting said motor, flat plate and movable contact; a plurality of squib casings, each of which has an apertured end secured relative to one of said plurality of intermediate apertures in said tank; a plurality of electrically controlled squibs in said casings; means electrically connecting each squib to one of said plurality of spaced contacts and to said movable contact; a second pressure line fitted in said other aperture in the other end of said tank; a chemical in each of said casings influenced by the burning of its adjacent squib to form pressurized gas, which enters said tank via said apertured end; and missile control motors connected to said second pressure line to utilize said pressurized gas.

References Cited in the file of this patent

Vistas in Astronautics, pp. 237–239, 1958, Pergamon Press, N.Y.